Nov. 30, 1937. F. L. BUCY ET AL Re. 20,561

METHOD FOR CURING RUBBER ARTICLES

Original Filed Oct. 1, 1934 2 Sheets-Sheet 1

Inventors
F. L. Bucy
V. A. LaRock
By Young & Young
Attorneys

Nov. 30, 1937. F. L. BUCY ET AL Re. 20,561

METHOD FOR CURING RUBBER ARTICLES

Original Filed Oct. 1, 1934 2 Sheets-Sheet 2

Inventors
F. L. Bucy and V. A. LaRock
By
Attorneys

Reissued Nov. 30, 1937

Re. 20,561

UNITED STATES PATENT OFFICE 20,561

METHOD FOR CURING RUBBER ARTICLES

Floyd L. Bucy and Vela A. La Rock, Eau Claire, Wis.

Original No. 2,035,861, dated March 31, 1936, Serial No. 746,392, October 1, 1934. Application for reissue June 1, 1937, Serial No. 146,701

6 Claims. (Cl. 18—53)

This invention is a continuation in part of our pending application, Serial No. 666,291, filed April 15, 1933, which is hereby abandoned in favor of the present application.

The present invention appertains to a novel method for curing tires and other rubber articles using internal pressure, such as steam, water, or air, to hold the tire expanded in the mold during the curing operation.

The invention also appertains to a method and apparatus for removing the trapped air in a curing bag or article before the article in the mold is cured, and also before the tire is completely cured, thereby insuring longevity to the bag and a shortening of the curing time.

In the common method now followed, considerable difficulty has been experienced in entirely eliminating the air from the curing bag or article when a fluid pressure is used, such as water or steam.

The objections to using air as a pressure alone is that not only is the curing time prolonged, but the air contained in the curing bag over a period of time under pressure and heat shortens the life of the bag.

The salient object of our invention is to provide a novel method of circulation in the curing bag, by the circulation of steam or water when the tire is shaping in the mold to force substantially all the air out of the bag before the tire is cured.

Another object of our invention is to provide a circulation of pressure in the tire while the same is being cured in the mold to further increase the life of the bag or article, and to eliminate all "dead spots" or air pockets in the article being cured, and to shorten the length of the curing time.

A further object of our invention is to provide means for using air as an internal pressure to hold the tire expanded, and to obtain practically the same results as with steam or water by a circulation of steam while the tire is being cured in the mold.

A further important object of our invention is to provide a valve which will operate with pressure only, with the valve attached directly to the bag stem or head, so that when the tire is placed in the mold the position thereof can be alternated, that is, one time with the valve placed down, and the next time with the valve placed up. This eliminates the placing of the bag continually in the mold with a certain side up, as it is a well-known fact that when the bag is placed continually in one position the same will deteriorate faster than if the position thereof is alternated.

Another important object of our invention is the provision of a valve so constructed and arranged that the internal pressure from the curing bag can be released in the heater with the steam pressure in the chamber of the heater. This allows the quick opening of the heater and increases the turnover of the equipment as well as increasing the life of the bag from deterioration.

A still further object of our invention is to provide means for holding the tire in its expanded position during the curing thereof in the mold, so that the fluid or air pressure can be substantially saved.

With these and other objects in view the invention consists in the novel construction, arrangement and formation of parts as will be hereinafter more specifically described, claimed, and illustrated in the accompanying drawings in which:—

Figure 1:
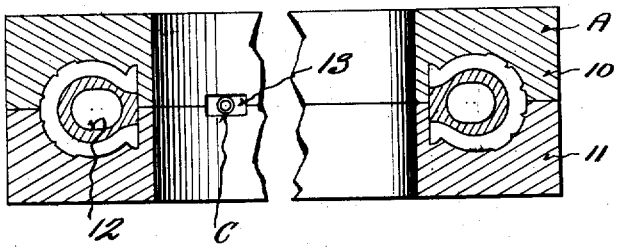
Figure 1 is a diametric section through a mold equipped with the device.

Referring to the drawings in detail, wherein similar reference characters designate corresponding parts throughout the several views, the letter A generally indicates a conventional mold for the curing of a rubber tire; B, a heater for receiving the molds; and, C, our improved device through the instrumentalities of which we are enabled to practice our novel circulating method.

While we have shown the invention applied to a conventional tire curing mold, and to a standard type heater, it is to be understood that our method can be practiced in devices for curing other rubber articles where internal pressure is used, such as water, steam, or air.

As shown, the mold and curing apparatus A embodies a pair of light companion circular mold sections 10 and 11 between which is received the annular curing bag 12, and obviously the tire being cured is received between the mold sections 10 and 11 with the bag arranged interiorly of the tire. The mold sections 10 and 11 at one point can be provided with mating notches or slots 13 for receiving our valve mechanism or novel device C, or other inlet tube. The novel device C comprises an elongated tubular casing or sleeve 15 which enters into and is secured to the curing bag 12, and, as shown, the inner end of the casing 15 is provided with an attaching plate 16 for engaging the inner face of the curing bag. This plate is held in air-tight connection with said base by the use of a nut or the like 17 threaded on the casing 15 into intimate contact with the outer face of the curing bag. The casing or sleeve 15 is adapted to extend exteriorly of the mold sections 10 and 11 through the notches or slots 13, and connected with the outer end of the casing in any preferred manner is the pressure head 18.

The pressure head 18 is provided with a bore 19, in which the housing or casing 15 is secured, and the outer end of the bore is reduced as at 20, and has secured therein the inlet pressure tube 21. The inner end of the pressure tube 21 extends beyond the plate 16 and into the curing bag, and the casing 15 can also be extended into the bag if so desired.

Figure 2:
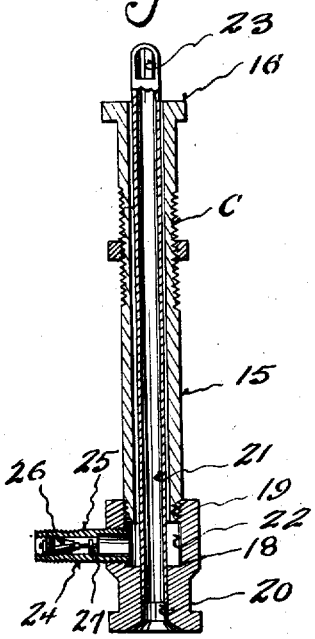
Figure 2 is an enlarged longitudinal section through the improved device.
Figure 4:
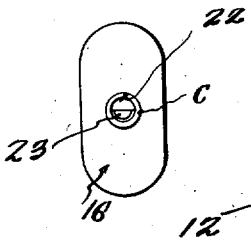
Figure 4 is an inner end elevation of the improved device.
Figure 3:
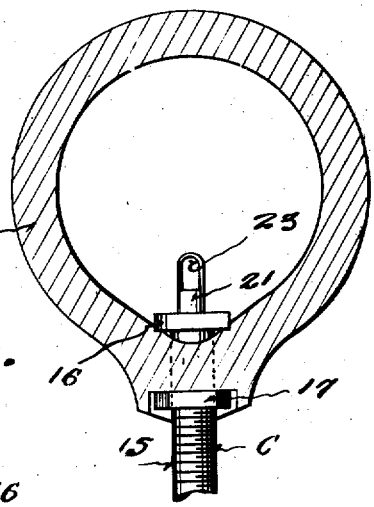
Figure 3 is an enlarged detail transverse section through the curing bag showing the regular attaching plate and nut for the device.

As clearly shown in Figure 2 of the drawings, the inlet pressure tube 21 is of a smaller diameter than the interior diameter of the casing or sleeve 15, and consequently a chamber 22 is provided between the housing 15 and head 18 and tube 21.

One of the important features connected with the invention is the arrangement of the outlet opening 23 formed in the inner end of the pressure tube 21, and it is to be noted that this outlet faces away from the side walls of the curing bag to drive the air in the bag in advance of the same and into the chamber 22 between the housing 15 and the tube 21 heretofore described. Obviously, the outer end of the head 18 receives an inlet head or coupling 40 (as will be later described) for the internal pressure.

The housing 15, or the head 18, as the case may be, carries an escape valve 24 which can be of any desired character, with a tensioned or spring-pressed disc or ball valve body. We prefer, however, to provide a special type of valve, whereby the air is allowed to automatically escape, and whereby the valve will automatically close or open when a predetermined pressure is reached.

This valve 24 includes a valve casing 25 suitably anchored to the head or sleeve, and the same receives an interior valve assembly or core 26. This valve assembly is similar to the valve cores utilized in automobile inner tubes, but in accordance with our invention, the valve body 27 is held off of its seat 28 by a tension spring 29, so as to permit the escape of air or steam past this valve and into the heater B. The valve is adapted to open or close against the tension of its spring by pressure acting on the same, and the valve can be set or adjusted to automatically close or open at any predetermined pressure, say, from five to one hundred and fifty pounds, according to the type of the rubber article being cured.

In the use of our device, the pressure is admitted into the bag 12 through the inlet tube 21, and the same flows out of the opening 23 around one side of the bag, forcing substantially all of the air in the bag ahead of the same. This air will be driven around the bag and into the chamber 22 and out of the exhaust valve 24. When the pressure reaches the valve the same will act to automatically force the valve on its seat, in that this pressure will overcome the tension of the spring 29.

Figure 5:
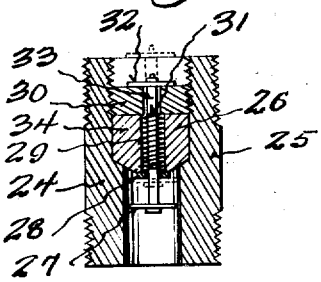
Figure 5 is an enlarged detail longitudinal section through the improved valve, whereby we are enabled to practice our method.
Figure 6:
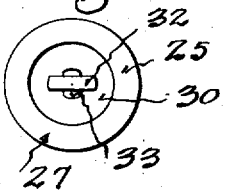
Figure 6 is an outer end elevation of the valve.

As shown in Figure 5, the valve assembly 26 is held in place by a lock nut 30 and the entire valve assembly can be removed and replaced by removing this nut. The valve stem 31 carrying the valve body 27 has a bar 32 on top of the lock nut, and this bar is narrower on two sides than the hole 33 in the lock nut, so air or steam can go in or out past the valve assembly. The valve stem passes through a sleeve 34, which is in tight connection with the casing 25. The seat 28 on this body 34 is of a round disc shape, which mates with the valve body 27 when the pressure on body 27 overcomes the tension of the spring 29. Thus, the valve body 27 is forced on the seat 28 to hold the pressure of the bag.

Figure 7:
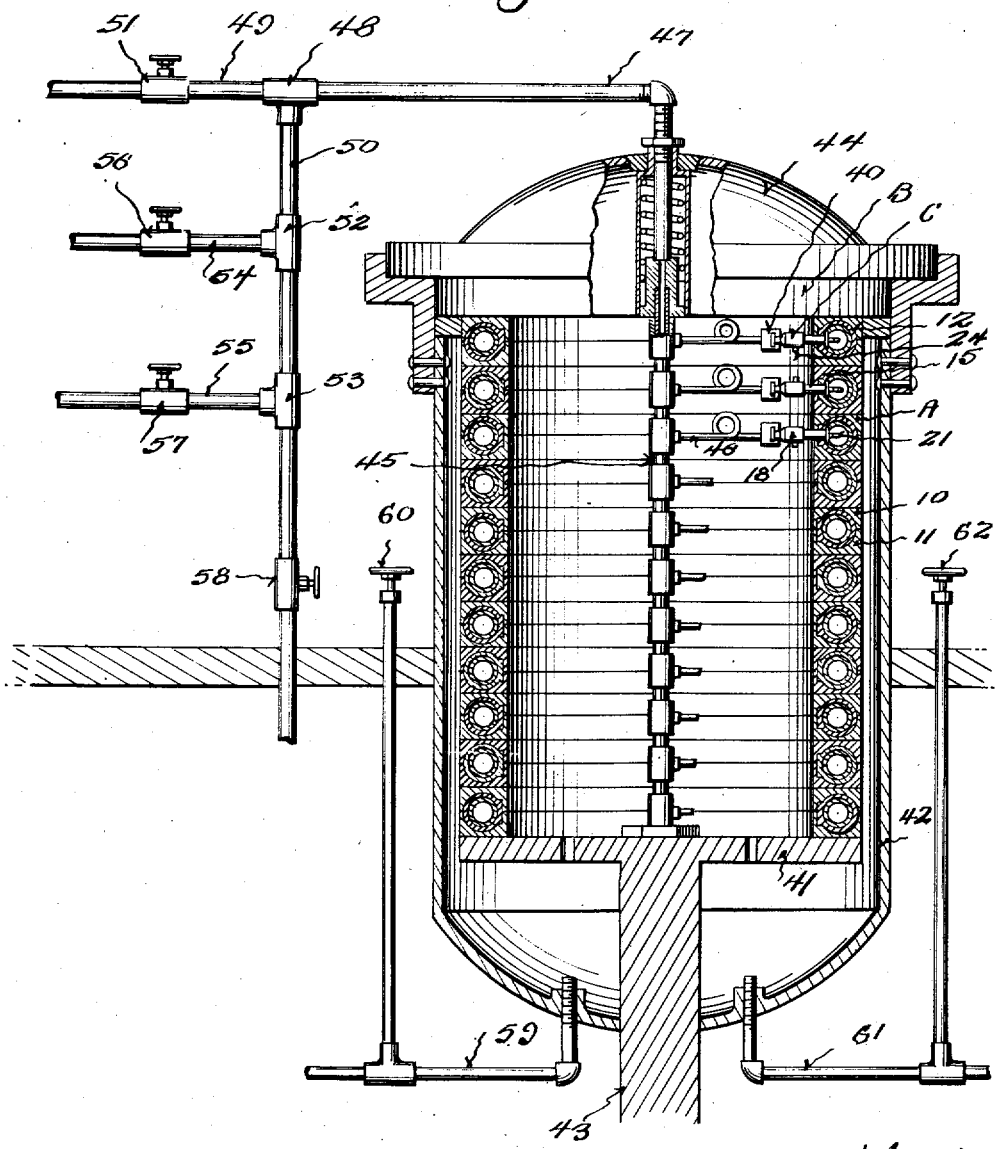
Figure 7 is a vertical section through a standard type of heater as used in curing tires, showing the use of our device therewith.

Referring to Figure 7, it will be noted that a plurality of molds A can be placed in heater B one upon the top of the other. The lower mold A rests upon the perforated ram plate or head 41 disposed within the heater casing 42. The ram head or plate 41 is carried by the ram 43, which can be actuated by any preferred means, not shown. The upper end of the heater casing 42 is closed by a removable cylinder head 44 by means of which the molds A are introduced into the heater casing. Arranged axially within the heater casing is a manifold pipe 45 having a plurality of branch pipes 46 of a flexible nature, which carry the coupling heads 40 for engaging the heads 18 of our improved device C. The manifold pipe has connected therewith an inlet pipe 47 which can be of a flexible nature, if so desired. This pipe is connected with, through the medium of a T coupling, right angularly extends pipes 49 and 50. The pipe 49 is a steam conducting pipe and has interposed in the length thereof a manually operated controlled valve 51. Coupled with the pipe 50 by means of T's 52 and 53 are pipes 54 and 55. The pipe 54 constitutes a water conducting pipe, and has interposed in the length thereof a manually operated valve 56. The pipe 55 constitutes an air conducting pipe, and has interposed in the length thereof a manually operated control valve 57. The lower end of the pipe 50 constitutes an exhaust, and has interposed in the length thereof an exhaust valve 58.

Leading into the lower end of the heater casing 42 is a steam conducting pipe 59, and the flow of steam therethrough is controlled by a manually operated valve 60. Leading from the bottom of the heater casing 42 is a steam outlet pipe 61 and the flow of steam through the outlet pipe is controlled by a manually actuated valve 62. As shown in Figure 7, the exhaust valves 24 can either point up or down, and these exhaust valves open into the heater casing.

To close the valve assembly 26, when it is set to close at say, at seventy-five pounds, pressure valves 51, 56, or 57, can be opened, depending upon the method followed. If steam is desired to first expand the tire in the mold, the valve 51 is opened (one hundred fifteen pounds steam at about 350 degrees) for, say, ten minutes. This closes the valve assembly 26 as soon as the air is driven around the curing bag, as this overcomes the seventy-five pounds tension on the spring 29. Then, if water pressure is used (two hundred and seventy-five pounds at 315 degrees) valve 51 is closed and valve 56 is opened, or if air pressure is used instead of water, valves 51 and 56 are closed and valve 57 is opened (two hundred seventy-five pounds air pressure).

After the desired valve 51, 56, or 57, is opened, valve 60 is opened, which supplies steam to the interior of the chamber or casing 42, which circulates around all parts of the molds, valves and attachments. Fifty-five pounds pressure is used which produces 305 degrees to cure the tires in the molds.

After the valve 60 has been opened for say twenty minutes, the valve 51, 56 or 57, as the case may be, is closed, and the valve 58 is opened, which exhausts the interior pressure from the bags to the outside of the heater casing. When this valve 58 is opened, and the pressure in the bags is reduced to one hundred thirty pounds (if hot water is used the temperature of the water still remains at 315°), this will automatically open the valve assembly, as the steam pressure of fifty-five pounds at 305° which is curing the tire in the mold, is added or combined to the seventy-five pounds tension on the spring 29 in the valve assembly. This action opens the valve 27, which allows the interior pressure of one hundred and thirty pounds in the bag to vent to the heater chamber against the fifty-five pounds of steam, which is curing the tire in the mold until it equalizes with the pressure of steam in the heater chamber. Then the steam enters the open valve and assembly 26, passes through the chamber 22 into the bag 12, and out through 23 or 21 to the opening at the end of the pipe 50. This causes circulation until the article or tire is cured, as well as holding the tire in its desired position against the mold.

Still another method can be followed to open the valve 27 or assemblies in the heater casing to cause circulation of steam, water or air pressure, whichever is required. This is as follows:—

The valve 27 is closed in the usual manner, as explained above, with the seventy-five pound tension on the spring. Steam, water, or air can be used at say one hundred fifty pounds pressure in the bag to expand the tire in the mold. Then the steam to the heater casing (valve 60) is opened, but is reduced to say forty pounds steam at 287° to cure the tire. After say twenty minutes, the steam pressure in the heater casing is raised to seventy-six pounds at about 322°.

This seventy-six pounds of steam is added or combined to the seventy-five pounds tension of the spring 29 and opens the valve assembly automatically against the one hundred and fifty pounds interior pressure in the bag. The interior pressure then vents into the heater casing against the steam pressure in the heater until the interior pressure is equalized with the steam pressure, which is curing the tire in the mold. Then the steam enters the open valve assembly 26, as explained before, and this pressure holds the tire in expanded position against the mold.

The same procedure by opening valve 58 can be practiced here also, if desired, after the heater pressure and spring overcomes the bag pressure.

Still another method can be used, the valve 27 is closed in the usual manner as explained heretofore. Steam, water, or air can be used, but after valve 60 has been opened, for say twenty minutes, the valve 51, 56, or 57, as the case may be, is closed, and valve 58 is opened, which exhausts the interior bag pressure to the outside of the heater casing, which action also releases the valve 24 to the interior of the heater casing, as explained heretofore. Valve 58 can be opened for a short period of time, or long enough for the bag pressure to vent, and the steam in the heater casing enter the bag or valve 24, and force the remaining or original air, steam or water out of the bag which was used to expand the tire before the curing operation. Then valve 58 is closed and valve 51, 56, 57 as the case may be, is again opened. This method can be repeated as often as necessary to eliminate the trapped air, or dead spots in the bag, while the tire is expanded and curing in the mold.

It is to be understood that the interior pressure in the bag must be higher than the pressure and steam which surrounds the mold in the heater casing, as the pressure in the bag must expand the tire in the mold, while the steam to cure the tire is applied to the heater casing for the steam cannot be allowed to enter between the tire and the mold, as this would destroy the tire.

Our method is practiced after the tire is shaped, and steam is applied to the mold which will have a tendency to semi-cure the tire before the interior pressure is released. Then our method of circulation is practiced.

From the foregoing description it can be seen that we have provided a novel circulation method, whereby all dead air is eliminated in the curing bag or article being cured.

As stated by our improved method, we are enabled to eliminate the oxidation of the curing bag, which will insure the longevity thereof and prevent ruining of the tires or other rubber articles cured in a hollow mold, due to any leaks in the curing bag or container.

The circulating method also insures the proper curing by providing the proper circulation of heat to all points of the article being cured.

Changes in details may be made without departing from the spirit or scope of the invention, but what we claim as new is:—

1. The method of curing rubber articles, such as tires, in a mold enclosed in a heater casing with a mold bag in the tire in said mold having an inwardly opening relief valve normally held off its seat by a spring of a predetermined pressure, which consists in, first, using steam to expand the bag in the tire and preheat the tire; second, further expanding the tire by a higher interior pressure and closing the valve against the pressure of the spring; third, applying steam under a vulcanizing temperature to the exterior of the mold; and fourth, applying additional steam under a higher degree of pressure to the exterior of the mold, said steam pressure on the exterior of the mold and the spring of the relief valve automatically releasing steam at a higher pressure than the exterior pressure from the interior of the bag.

2. The method of curing rubber articles, such as tires, in a mould enclosed in a heater casing, with a mould bag in the tire having a relief valve normally held off of its seat by a spring; which consists in first, admitting pressure into the mould bag from the exterior of the heater to expand the tire to the mould and force the valve on its seat against its spring to hold the pressure of the mould bag; second, admitting steam pressure in said heater on the exterior of the mould, and third, releasing the normal interior bag pressure to the exterior of the heater casing so that the steam pressure in said heater casing acting on the exterior of the mould and the pressure of the spring of the relief valve will automatically force the valve from its seat and release a higher pressure than the exterior pressure on the mould from the interior of the bag into the heater casing.

3. The method of curing rubber articles, such as tires, in a mould enclosed in a heater casing, with a mould bag in the tire having a relief valve normally held off of its seat by a spring; which consists in, first, admitting pressure into the mould bag from the exterior of the heater to expand the tire to the mould and force the valve on its seat against its spring to hold the pressure of the mould bag; second, admitting steam pressure in said heater to the exterior of the mould; third, releasing the normal interior bag pressure to the exterior of the heater casing so that the steam pressure in the heater acting on the exterior of the mould and the pressure of the spring of the relief valve will automatically force the valve from its seat and release a higher pressure than the exterior pressure on the mould from the interior of the bag into the heater casing, and fourth, admitting interior pressure into the mould bag from the exterior of the heater casing, said pressure forcing the valve on its seat against its spring and the steam pressure on the exterior of the mould in said heater.

4. The method of mold-vulcanizing a cord-reinforced pneumatic tire with an expansible core which comprises driving air from the core by conducting a non-deteriorating distending fluid other than air under pressure into the core while venting fluid from the core, stopping the venting of fluid upon the attaining of a predetermined difference of pressures between that of the distending fluid within the core and that of fluid flowing from the core, and retaining the distending fluid within the core to hold it and the tire distended, the said predetermined difference of pressures being effected after a sufficient flow of the said distending fluid through the core to wash substantially all of the air therefrom.

5. The method of mold-vulcanizing a cord-reinforced pneumatic tire with an expansible core which comprises driving air from the core by conducting a non-deteriorating distending fluid other than air under pressure into the core while venting fluid from the core, stopping the venting of fluid upon the attaining of a predetermined difference of pressures between that of the distending fluid within the core and that of fluid flowing from the core, and retaining the distending fluid within the core to hold it and the tire distended, the distending fluid being jetted into the core longitudinally thereof and the air being vented substantially at the position at which the distending fluid enters the core, and the said predetermined difference of pressures being effected after a sufficient flow of the said distending fluid through the core to wash substantially all of the air therefrom.

6. The method of mold-vulcanizing a cord-reinforced pneumatic tire with an expansible core which comprises driving air from the core by conducting a non-deteriorating distending fluid other than air under pressure into the core while venting fluid from the core, stopping the venting of fluid upon the attaining of a predetermined difference of pressures between that of the distending fluid within the core and that of fluid flowing from the core, and retaining the distending fluid within the core to hold it and the tire distended, the air being vented substantially at the position at which the distending fluid enters the core, and the said predetermined difference of pressures being effected after a sufficient flow of the said distending fluid through the core to wash substantially all of the air therefrom.

FLOYD L. BUCY.
VELA A. LA ROCK.